United States Patent
Neitzel

[11] 3,844,488
[45] Oct. 29, 1974

[54] APPARATUS FOR PULPING AND GRADING OF WASTE PAPER

[75] Inventor: Walter Neitzel, Varel, Germany

[73] Assignee: J. M. Voith GmbH, Heidenheim, Germany

[22] Filed: July 27, 1972

[21] Appl. No.: 275,830

[30] Foreign Application Priority Data
Aug. 12, 1971   Germany............................ 2140372

[52] U.S. Cl............. 241/43, 241/46.02, 241/46.17, 241/73
[51] Int. Cl............................................ B02c 13/02
[58] Field of Search ......... 241/43, 45, 46.02, 46.06, 241/46.08, 46.11, 46.17, 70, 73, 62, 79, 154, 28, 79.1

[56]                References Cited
              UNITED STATES PATENTS
2,452,135   10/1948   Lowe................. 241/46.17
3,073,535   1/1963    Vokes................ 241/46.11
3,595,488   7/1971    Blakely et al......... 241/28
3,698,649   10/1972   Herbert.............. 241/46.02 X
3,717,307   2/1973    Beck................. 241/46.11 X
3,720,379   3/1973    Szgevari............. 241/73 X
3,722,832   3/1973    Seifert.............. 241/46.17 X Primary Examiner—Donald G. Kelly
Assistant Examiner—Howard N. Goldberg
Attorney, Agent, or Firm—Michael S. Striker

[57]               ABSTRACT

A receptacle accommodates a waste paper suspension and a rotor located adjacent one portion of the receptacle wall. A first outlet is provided in the wall in the region of the rotor so that pulp produced by shredding of waste paper by the rotor can be discharged from the receptacle. A strainer is interposed in the first outlet, and a second outlet is provided in an opposite portion of the wall and arranged to discharge matter having low specific gravity from the receptacle.

17 Claims, 3 Drawing Figures

APPARATUS FOR PULPING AND GRADING OF WASTE PAPER

BACKGROUND OF THE INVENTION

The present invention relates to the preparation of waste paper stock in general, and more particularly to an apparatus for pulping and grading of waste paper to thereby produce a waste paper stock therefrom.

The recovery of pulp or stock from waste paper is well known per se. It is known that for this purpose the waste paper must be shredded in a suspension, to form from it a pulp which can be further processed. A difficulty in the preparation of stock from waste paper resides in the fact that quite often substances of low specific gravity, such as synthetic plastic foams, rubber, foils and the like are contained in the waste paper, substances which can be removed from the receptacle wherein the pulping takes place neither through the pulp outlet nor through the outlet provided for removal of heavy substances which are not intended to be used as part of the pulp. The difficulties created by this light-weight matter, hereafter designated for the sake of convenience as "impurities", result from the fact that such matter accumulates very rapidly in the receptacle so that after an operating period of only a few days the apparatus must be shut down to permit a complete emptying of the receptacle. It has been observed that in many instances the operating time of the apparatus, that is the time from one to the next shut-down and complete emptying of the receptacle of the apparatus, is as little as two or three consecutive days.

It goes without saying that a complete shutdown of the apparatus means lost time and increased expenses, and that this is not tolerable. The problem having been realized, the prior art has proposed to withdraw from the receptacle a partial stream of the pulped suspension, to supply it to an additional pulper or disintegrator and to a subsequent coarse grading device, and then to return it into the original receptacle. Such an approach does offer some hope of improvement, but quite evidently it also will increase the expenses involved and decrease the economy of operation of an apparatus of the type here under discussion, due to the investment costs required for the additional equipment and the increased energy requirements for operating such equipment. The problem outlined above thus has not heretofore been satisfactorily solved.

SUMMARY OF THE INVENTION

It is, accordingly, a general object of the present invention to provide an improved apparatus for pulping and grading of waste paper, which is not possessed of the disadvantages outlined above with respect to the prior art.

More particularly, it is an object of the present invention to provide such an apparatus which assures the longest possible operating period before complete emptying of the apparatus becomes necessary.

An additional object of the invention is to provide such an apparatus which is simple in its construction and reliable in its operation.

In pursuance of these objects and of others which will become apparent hereafter, one feature of the invention resides, in an apparatus for pulping and grading of waste paper, in the provision of a combination which comprises a receptacle adapted to accommodate a waste paper suspension and having a peripheral wall, and rotor means located in said receptacle adjacent one portion of said wall and being operative for shredding said waste paper in said suspension so as to obtain a pulp. First outlet means is provided in the wall in the region of the rotor for discharge of the pulp from the receptacle, and strainer means is provided for straining the pulp which is discharged through the first outlet means. In accordance with the invention there is further provided second discharge means, in another portion of the wall which is opposite the one portion and the rotor means and this second discharge means serves for discharging from the receptacle of matter having low specific gravity.

It has been found that the flow of suspension which is caused in the receptacle by the operation of the rotor causes an accumulation of the low specific gravity matter, that is the light-weight matter, in the region of the aforementioned other wall portion. If the second discharge means is provided in this region, then the accumulating light-weight matter or "impurities" will flow out through this second discharge means. It is advantageous to normally keep the second discharge means closed in order to avoid significant losses of desirable pulp matter, and to open it only briefly from time to time to permit the discharge of accumulated impurities.

It has been found that in an apparatus according to the present invention it is possible to operate the apparatus continuously for periods of several weeks before it becomes necessary to shut the apparatus down in order to empty it out completely.

According to a further concept of the invention it may be advantageous to connect the second discharge means with a suction arrangement, for instance a pump or a gravity tube, to assure that the impurities can be readily discharged from the receptacle in a simple and reliable manner even if the receptacle is of the open type, that is not of the type which is under internal overpressure.

The receptacle may further be provided in an inner surface of its peripheral wall with an annular recess which is coaxial with the axis of rotation of the rotor. In such a recess the heavy fraction of the waste paper will settle, and can then be removed by means of an appropriate outlet communicating with this recess. In such a construction both undesirable fractions, namely the light-weight impurities and the heavy-weight matter, can be removed without any difficulties so that only the desirable pulp will be recovered for further use.

The rotor itself may be of such construction that the vortex flow created in the suspension by rotation of the rotor, and which extends coaxial with the axis of rotation of the rotor, will have a vortex core which extends from the rotor to the opposite wall portion of the receptacle, that is the wall portion in which the discharge means for the impurities is located. In such a construction, the vortex core is essentially centered in the receptacle and the region where the discharge for the impurities must be provided, can thus be determined precisely.

It is particularly advantageous if upstream of the receptacle there is located an additional unit also having a receptacle adapted to accommodate a waste paper suspension and being in its arrangement and its associated components -- namely the rotor means, the first outlet means and the strainer means -- essentially similar to the apparatus already outlined. The outlet for the pulp which issues from the additional receptacle then communicates with an inlet of the first-mentioned receptacle, and the strainer means should be coarser than that of the first-mentioned receptacle.

In place of the second discharge means for light-weight impurities, the second receptacle is provided in the wall portion opposite its rotor with an outlet through which tangled suspension components can be withdrawn in form of elongated rope-like wads. With such an apparatus all undesirable contaminants accommodated in or forming part of the waste paper can be largely removed, thus assuring the production of a high-grade pulp having a minimum of contaminants, and at the same time assuring a maximum length of continuous operation without downtime. The energy required for operating the first-mentioned receptacle with its associated components, that is the receptacle having the second discharge means for the light-weight impurities, is relatively small, because the rotor of this second receptacle or downstream receptacle will be required only for additional shredding of the waste paper which has already received its initial shredding in the upstream receptacle, and the desired flow providing for the discharge of the light-weight impurities through the second discharge means is produced as a highly desirable incidental effect requiring no additional energy. The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
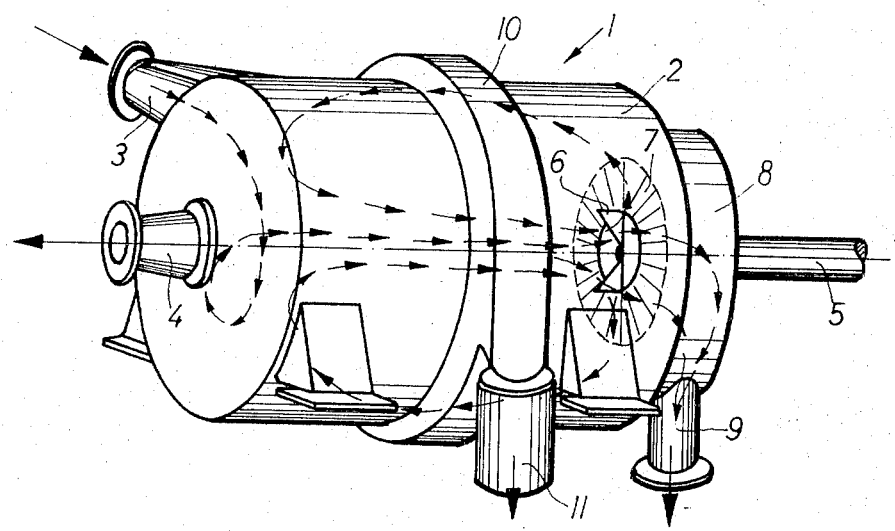
FIG. 1 is a perspective view illustrating one embodiment of the invention.

Discussing now firstly FIG. 1 of the drawing it will be seen that in this embodiment there is provided an apparatus 1 in accordance with the present invention. This apparatus 1 is a part of a waste paper stock preparation plant the details of which are not illustrated, because they do not form a part of the invention and are known per se. What is novel in accordance with the present invention is the apparatus 1, a pulper and grader for waste paper. The apparatus 1 has a receptacle or housing 2 which in the illustrated embodiment is substantially cylindrical in its configuration and is a closed housing. Its axis of symmetry is horizontal in this embodiment.

The housing 2 has a peripheral wall which is provided, in the region of one axial end of the receptacle 2, with a supply conduit 3 which enters substantially tangentially and supplies into the housing 2 a suspension of waste paper and a liquid, usually water. A drive shaft 5 extends into the housing through the opposite axial end wall thereof, the drive shaft 5 being adapted to be driven in rotation by a non-illustrated motive source. Mounted at or on the inner end portion of the drive shaft 5 is a rotor 6 which is itself of known construction, and, when rotated by rotation of the drive shaft 5 shreds the waste paper in the suspension in the interior of the housing 2 and forces the thus obtained pulp through a screen 7 and subsequently into a collecting chamber 8 from which the pulp enters into an outlet 9. The circumferential wall of the housing 2 is provided in this embodiment with an annular recess 10 with which an outlet 11 communicates.

The axial end of the housing 2 which is opposite that end at which the rotor 6 is located, is provided with an outlet 4, and in the illustrated embodiment the axis of rotation of the rotor 6 and the longitudinal axis of the outlet 4 are coincident.

Rotation of the rotor 6 causes in the suspension accommodated in the housing 2 a flow pattern which is indicated by the arrows of FIG. 1. It is clear that the suspension entering into the housing 2 from the tangentially discharging inlet conduit 3 is given a flow direction in the region of the end wall where the inlet 3 discharges, which causes it to flow in axial direction longitudinally of the axis of rotation of the rotor 6 and towards the latter. The pulp or stock which results from shredding of the waste paper in the suspension by the rotor 6 is forced by the rotor through the screen or strainer 7 to subsequently enter the outlet 9. Those suspension components which have not been sufficiently shredded to pass through the strainer 7 flow substantially along the circumferential wall of the housing 2 back to the end wall in the region of which the inlet 3 discharges the newly incoming suspension.

Heavy suspension components, for instance metallic contaminants in the suspension, will settle in the recess 10. Light-weight components or impurities, for instance synthetic plastic foam, rubber or the like, accumulate in the region of the end wall provided with the outlet 4 and leave the housing 2 through the latter. Advantageously the outlet 4 is provided with a closing device, for instance a known valve or the like, not shown, which normally closes the outlet 4 and which is opened only from time to time to permit the removal of accumulated light-weight contaminants or impurities without resulting in the loss of a substantial amount of pulp or useable waste paper.

It will be understood that the rotation of the rotor 6 causes a vortex flow which extends axially along the axis of rotation of the rotor 6 to the end wall provided with the outlet 4. The flow has a vortex core centered on the one hand by the construction of the rotor 6 and on the other hand by the housing wall, so that the location for the outlet 4 can be precisely determined in conjunction with the readily calculable manner in which the light-weight impurities will be ejected from the vortex core.

Figure 2:
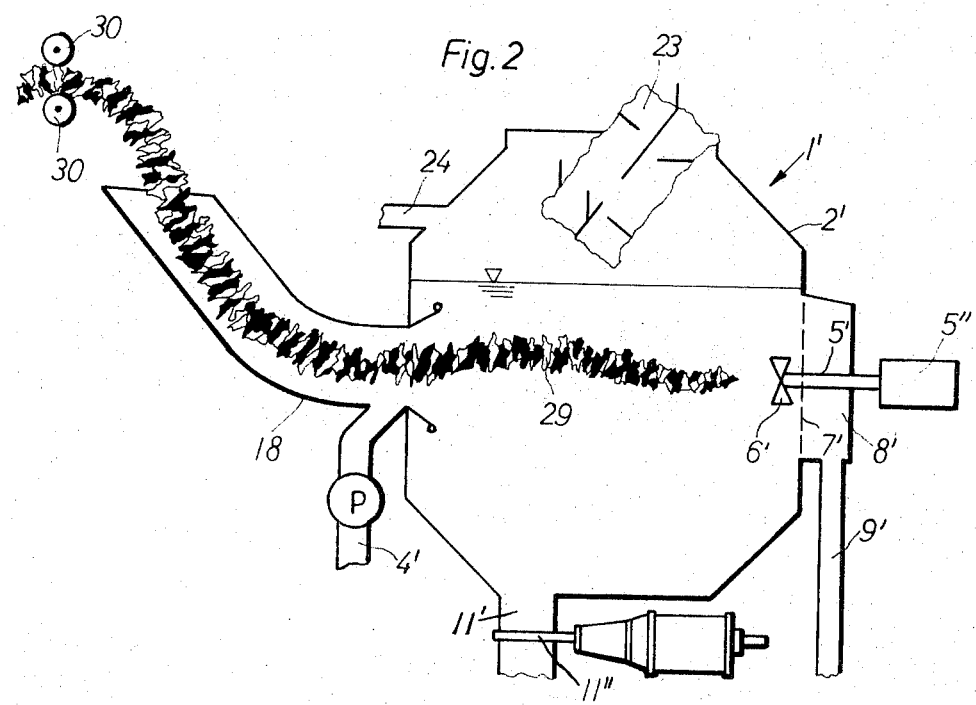
FIG. 2 is a diagrammatic vertical section through another embodiment of the invention.

In FIG. 2 I have illustrated an embodiment which is quite similar to that of FIG. 1 except that the housing 2' is open, rather than closed as the housing 2 in FIG. 1. In FIG. 2, components similar to those of FIG. 1, have been given the same reference numerals but with a prime suffix. A conduit 18 communicates with that end wall of the housing 2' which is axially spaced from the rotor 6', the latter being mounted on the drive shaft 5' which here is shown as being connected with the drive means 5'', the latter being diagrammatically illustrated and representative of an electric motor or the like.

The purpose of the conduit 18 is to permit the withdrawal of rope-like wads 29 of tangling components of the suspension. The formation of such wads is well known and they can be withdrawn by means of the withdrawal rollers 30, 30 shown in FIG. 2, one or both of which may be driven for this purpose.

An outlet conduit 4', corresponding to the outlet 4 of FIG. 1, communicates with the conduit 18 for the withdrawal of the light-weight impurities from the interior of the housing 2'. In the embodiment of FIG. 2, the conduit 4' has interposed in it a suction means, here illustrated in form of a pump P, although it is possible to replace the pump P by constructing the outlet conduit 4' itself as a gravity tube in which suction is created by the gravity descent of matter in the tube. The outlet 11' is here provided with a slide valve 11'' for controlling the outflow of matter.

Reference numeral 23 designates in this embodiment a bail of waste paper to be shredded and reference numeral 24 designates an inlet conduit for liquid.

Figure 3:
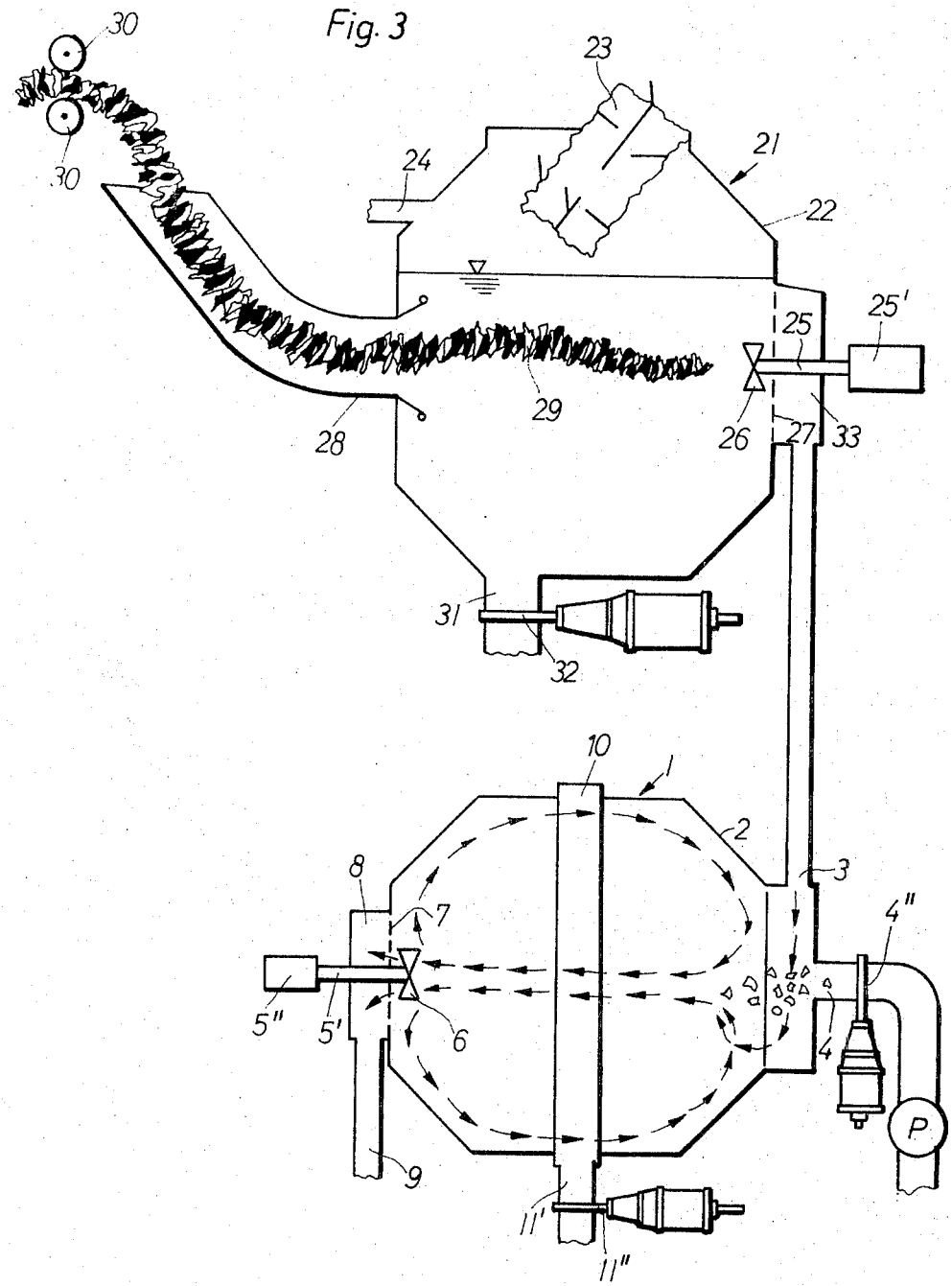
FIG. 3 is a diagrammatic vertical section through still an additional embodiment of the invention.

FIG. 3, finally, illustrates still a further embodiment of the invention. Here, there is provided an apparatus 1 which is essentially the same as that shown in FIG. 1, but which operates in conjunction with an apparatus 21 resembling essentially (but with some modifications) the apparatus of FIG. 2. In particular, like components are identified with like reference numerals as in the preceding embodiments to the extent possible without producing confusion.

In FIG. 3 the apparatus 21 has a housing 22 or a receptacle, which is open at the top, and into which bales 23 of waste paper to be pulped are introduced. Reference numeral 24 designates an inlet conduit for admission of liquid in which the paper is to be suspended.

One side wall of the housing 22 has a drive shaft 25 of the drive 25' passing therethrough, carrying at the inner end located within the housing 22 a rotor 26 which may be similar to the one shown in FIG. 1. The rotor 26 again serves for shredding of the waste paper which circulates in suspension in the housing 22, and for forcing the shredded waste paper in form of a pulp through the screen 27 into the chamber 33 from where it passes into the inlet conduit 3 of the housing 2 of the apparatus 1 which is located downstream with respect to the apparatus 21. Clearly it is not necessary that the apparatus 1 be located physically at a lower lever than the apparatus 21 but it must be kept in mind that the apparatus 1 is to be located downstream of the apparatus 21, that is it must receive pulp from the latter.

The wall of the housing 22 which is located oppositely to and spaced from the rotor 26 is provided with a conduit 28 whose purpose is the same as the conduit 18 in FIG. 2, namely to permit withdrawal of a rope-like wad 29 of tangling matter which is part of the bales 23 of incoming waste paper. The wad 29 is withdrawn by the withdrawing arrangement 30 which is the same as that in FIG. 2.

The bottom wall of the housing 22 is provided with an outlet conduit 31 through which heavy fractions of the suspension, for instance, metallic parts or the like, can be withdrawn after settling at the bottom. The outflow of matter through the outlet conduit 31 is controlled by a slide valve 32 which is operated by a diagrammatically illustrated arrangement, and which is opened from time to time to permit the issuance of the accumulated heavy matter.

The apparatus 1 is essentially the same as that illustrated in FIG. 1, except that as shown in FIG. 3, the apparatus 1 is turned end for end with respect to the showing in FIG. 1. It is emphasized that although the housing 2 of the apparatus 1 in FIG. 3 is closed, as is the case in FIG. 1 also, the housing could be open as is the housing 22 of the apparatus 21. The screen 27 is coarser -- that is of larger mesh -- than the screen 7 of the apparatus 1 so that pre-pulping takes place in the apparatus 21 and final pulping in the apparatus 1. As in the embodiment of FIG. 1, the flow is illustrated with the arrows in the housing 2 of the apparatus 1 and it will be seen that the impurities of light-specific gravity are shown as tending to accumulate in the region of the axial end wall which is remote from the rotor 6, that is in the region where the outlet 4 is provided. In FIG. 3 I have shown that the outlet 4 can be normally closed by means of a slide valve 4'' and can be opened from time to time to permit withdrawal of the accumulated light-weight impurities, for instance by means of the diagrammatically illustrated pump P. Maintaining the outlet 4 normally closed prevents the loss of desirable matter, that is of pulp or the like. The circumferential recess 10 resembles the one illustrated in FIG. 1 and is provided for the same purpose. Its outlet 11' is closed by a slide valve 11'', which is normally closed and can be opened from time to time to permit the removal of accumulated heavy matter. The control of the movements of the slide valves 4'' and 11' is effected by the diagrammatically illustrated devices which do not form a part of the invention and require no further detailed discussion.

Due to the fact that the mesh size of the screen or strainer 27 of the apparatus 21 is relatively large, between substantially 14 and 25 mm. with respect to substantially 4 – 14 mm. for the screen 7 of the apparatus 1, the light-weight impurities can leave the apparatus 21 together with the pulp. This prevents the light-weight impurities from blocking the apparatus 21 after a relatively short period of operation. The tangling components, however, are almost completely removed in form of the wad 29 so that the suspension as it enters the apparatus 1 contains almost no such components. On the other hand, the light-weight impurities are almost completely removed in the apparatus 1, so that they cannot accumulate therein and do not necessitate the shutting-down of the apparatus except after periods of operation which may last as long as several weeks.

With the embodiment in FIG. 3, the volumetric content of the housing 2 of the apparatus 1 can be substantially smaller than that of the housing 22 of the apparatus 21. Practical tests have shown that a size ratio of 10 : 1 for the apparatus 21 versus the apparatus 1 is possible, and it has been determined that a volumetric content of between 20–40 m$^3$ for the apparatus 21 and of about 3.5 m$^3$ for the apparatus 1 are advantageous.

It will be seen that with the present invention the difficulties of the prior art have been overcome and the objects outlined herein have been attained. It is now possible to operate an apparatus according to the present invention for periods of several weeks without having to shut it down in order to remove accumulated light-weight impurities from the housing or receptacle. Evidently, this not only results in a saving in down-time, but also in a generally more economic operation of the apparatus.

It will be understood that each of the elements described above, or two or more together, may also find a useful application in other types of constructions differing from the types described above.

While the invention has been illustrated and described as embodied in an apparatus for pulping and grading of waste paper, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In an apparatus for the comminution and grading of waste material, particularly for the pulping and grading of waste paper, a combination comprising container means for accommodating a suspension of waste material; means for comminuting at least part of said waste material in said container means so as to obtain an impurity component of low specific gravity, a stock component and an additional component of high specific gravity, said comminuting means causing accumulation of said impurity component in a portion of said container means spaced from said comminuting means; outlet means for discharge of said stock component from said container means; discharging means in the region of said portion for discharging said impurity component from said container means; a substantially annular recess in said container means for accumulation of said additional component; and additional outlet means communicating with said recess for removal of said additional component therefrom.

2. A combination as defined in claim 1, wherein said comminuting means comprises rotor means.

3. A combination as defined in claim 1, wherein said outlet means is located in the region of said comminuting means.

4. A combination as defined in claim 1; and further comprising strainer means for straining the stock component discharged through said outlet means.

5. A combination as defined in claim 1, wherein said outlet means and said discharging means each include an outlet duct.

6. In an apparatus for the comminution and grading of waste material, particularly for the pulping and grading of waste paper, a combination comprising container means for accommodating a suspension of waste material; means for comminuting at least part of said waste material in said container means so as to obtain an impurity component of low specific gravity and a stock component, said comminuting means causing accumulation of said impurity component in a portion of said container means spaced from said comminuting means; outlet means for discharge of said stock component from said container means; and discharging means in the region of said portion for discharging said impurity component from said container means, said discharging means comprising suction means.

7. A combination as defined in claim 1, wherein said discharging means comprises a pump.

8. A combination as defined in claim 1, wherein said discharging means comprises a gravity tube.

9. A combination as defined in claim 1, said comminuting means being effective for creating in said suspension a vortex flow having a core region; and wherein said portion of said container means extends across said core region.

10. In an apparatus for the comminution and grading of waste material, particularly for the pulping and grading of waste paper, a combination comprising container means for accommodating a suspension of waste material; means for comminuting at least part of said waste material in said container means so as to obtain an impurity component of low specific gravity and a stock component, said comminuting means causing accumulation of said impurity component in a portion of said container means spaced from said comminuting means; outlet means for discharge of said stock component from said container means; discharging means in the region of said portion for discharging said impurity component from said container means, said discharging means, said outlet means, said comminuting means and said container means together defining a first unit; and an additional unit arranged in series with said first unit, one of said units initially comminuting said waste material so as to obtain an initial stock component, and the other of said units further comminuting at least said initial stock component.

11. In an apparatus for the comminution and grading of waste material, particularly for the pulping and grading of waste paper, a combination comprising container means for accommodating a suspension of waste material; means for comminuting at least part of said waste material in said container means so as to obtain an impurity component of low specific gravity, a stock component and impurity components which become entangled so as to form elongated rope-like wads, said comminuting means causing accumulation of said impurity compounds of low specific gravity in a portion of said container means spaced from said comminuting means; outlet means for discharge of said stock component from said container means; discharging means in the region of said portion for discharging said impurity component of low specific gravity from said container means; and an outlet in the region of said portion for withdrawal of said wads from said container means.

12. A combination as defined in claim 11; and further comprising withdrawing means for withdrawing said wads from said container means.

13. In an apparatus for pulping and grading of waste paper, a combination comprising a receptacle for accommodating a waste paper suspension, said receptacle having wall means including a peripheral wall and two oppositely located end walls; rotor means located in said receptacle adjacent one of said end walls for shredding the waste paper in said suspension so as to obtain a pulp; said rotor means having an axis of rotation; first outlet means provided in said wall means in the region of said rotor means for discharge of pulp from said receptacle; strainer means for straining of pulp discharged through said first outlet means; second outlet means provided in the other of said end walls for discharge from said receptacle of matter having low specific gravity; an annular recess provied in an inner surface of said peripheral wall coaxial with said axis of rotation for accumulation of matter having high specific gravity; and third outlet means communicating with said recess for removal of accumulated matter therefrom.

14. In an apparatus for pulping and grading of waste paper, a combination comprising a receptacle for accommodating a waste paper suspension, said receptacle having wall means including a peripheral wall and two oppositely located end walls; rotor means located in said receptacle adjacent one of said end walls for shredding the waste paper in said suspension so as to obtain a pulp; first outlet means provided in said wall means in the region of said rotor means for discharge of pulp from said receptacle; first strainer means for straining of the pulp discharged through said first outlet means; an outlet provided in the other of said end walls for withdrawal of tangled suspension components in form of elongated rope-like wads; withdrawing means for withdrawing said wads through said outlet; an additional receptacle having additional wall means including an additional peripheral wall and two oppositely located additional end walls, said additional receptacle also having an inlet communicating with said first outlet means; additional rotor means located in said additional receptacle adjacent one of said additional end walls; additional first outlet means provided in said additional wall means in the region of said additional rotor means for discharge of pulp from said additional receptacle; second strainer means similar to said first strainer means; and second outlet means provided in the other of said additional end walls for discharge from said additional receptacle of matter having low specific gravity.

15. A combination as defined in claim 2, said container means having a peripheral wall and two oppositely located end walls; and wherein said rotor means comprises a rotor located in said container means adjacent one of said end walls, said discharging means being provided at the other of said end walls.

16. A combination as defined in claim 1, said comminuting means producing an additional component of high specific gravity during comminution of said waste material; and further comprising additional outlet means for removal of said additional component from said container means.

17. A combination as defined in claim 1, said comminuting means being rotatable about an axis of rotation; and wherein said discharging means is located in a direct line with said axis of rotation.

* * * * *